(12) United States Patent
Moriwaki

(10) Patent No.: US 12,548,603 B2
(45) Date of Patent: Feb. 10, 2026

(54) SEMICONDUCTOR STORAGE DEVICE COMPRISING A REPLICA BIT LINE CIRCUIT

(71) Applicant: Socionext Inc., Kanagawa (JP)

(72) Inventor: Shinichi Moriwaki, Yokohama (JP)

(73) Assignee: Socionext Inc., Kanagawa (JP)

( * ) Notice: Subject to any disclaimer, the term of this patent is extended or adjusted under 35 U.S.C. 154(b) by 102 days.

(21) Appl. No.: 18/594,877

(22) Filed: Mar. 4, 2024

(65) Prior Publication Data

US 2024/0212724 A1 Jun. 27, 2024

Related U.S. Application Data

(63) Continuation of application No. PCT/JP2021/033716, filed on Sep. 14, 2021.

(51) Int. Cl.
*G11C 7/06* (2006.01)

(52) U.S. Cl.
CPC ........ *G11C 7/065* (2013.01); *G11C 2207/065* (2013.01)

(58) Field of Classification Search
CPC ... G11C 11/41–419; G11C 7/065; G11C 7/12; G11C 7/227; G11C 2207/065
See application file for complete search history.

(56) References Cited

U.S. PATENT DOCUMENTS

| | | | |
|---|---|---|---|
| 8,325,512 B2 | 12/2012 | Chuang et al. | |
| 2005/0286323 A1 | 12/2005 | Ohtsuki et al. | |
| 2010/0232244 A1 | 9/2010 | Hirabayashi | |
| 2012/0075936 A1 | 3/2012 | Fujimura | |
| 2022/0399052 A1* | 12/2022 | Chu | G11C 11/4096 |

FOREIGN PATENT DOCUMENTS

| | | |
|---|---|---|
| JP | 2006-012240 A | 1/2006 |
| JP | 2010-218617 A | 9/2010 |
| JP | 2012-069214 A | 4/2012 |

OTHER PUBLICATIONS

International Search Report dated Nov. 2, 2021 issued in International Patent Application No. PCT/JP2021/033716, with English translation.

* cited by examiner

*Primary Examiner* — Alfredo Bermudez Lozada
(74) *Attorney, Agent, or Firm* — Rimon P.C.

(57) ABSTRACT

A semiconductor storage device includes a memory cell array having a plurality of memory cells connected to bit line pairs. At the time of data read from a memory cell, a replica bit line signal is output to a replica bit line in response to a replica word line signal, and a sense amplifier startup signal changes in response to the replica bit line signal whereby a sense amplifier is driven. At the time of data write into a memory cell, a low potential-side bit line of a write-target bit line pair is brought to a negative potential in response to a negative potential boost signal output from a negative potential generation circuit.

5 Claims, 11 Drawing Sheets

SEMICONDUCTOR STORAGE DEVICE COMPRISING A REPLICA BIT LINE CIRCUIT

CROSS-REFERENCE TO RELATED APPLICATIONS

This is a continuation of International Application No. PCT/JP2021/033716 filed on Sep. 14, 2021. The entire disclosure of this application is incorporated by reference herein.

BACKGROUND

The present disclosure relates to a semiconductor storage device.

With the speedup of a semiconductor storage device, it has become difficult to generate various operation signals required for operating the device at appropriate timing.

Japanese Unexamined Patent Publication No. 2006-12240 (Patent Document 1) discloses a semiconductor storage device in which a startup signal for a sense amplifier circuit is generated using a replica circuit. The replica circuit includes a replica memory cell resembling, in structure, a memory cell included in a memory array.

U.S. Pat. No. 8,325,512 (Patent Document 2) describes use of a negative bit-line technique as a write assist technique in a semiconductor storage device. In this case, a dummy bit line is connected, as a load, to a circuit that generates a timing signal for bringing down a bit line to a negative potential.

However, conventional circuits that generate a startup signal for a sense amplifier circuit are used only at the time of data read from memory cells, not used at the time of data write into memory cells (see Patent Document 1, for example). Therefore, a circuit for use at the time of data write is separately necessary.

Also, conventional write assist techniques are used only at the time of data write into memory cells, not used at the time of data read from memory cells (see Patent Document 2, for example). Therefore, a circuit for use at the time of data read is separately necessary.

That is, conventionally, when it is intended to respond to both the time of data read from memory cells and the time of data write into memory cells, individual circuits responsive to these needs are necessary, causing a problem of increasing the circuit area.

To solve the above problem, an objective of the present disclosure is eliminating an area overhead arising from preparing individual circuits for data read and data write.

SUMMARY

According to one mode of the present disclosure, a semiconductor storage device includes: a memory cell array including a plurality of memory cells, each of the plurality of memory cells being connected to a corresponding bit line pair; a replica bit line circuit including a plurality of replica memory cells, each of the plurality of replica memory cells outputting a replica bit line signal to a common replica bit line in response to a replica word line signal; a sense amplifier circuit for amplifying a signal on the bit line pair in response to a sense amplifier startup signal generated based on the replica bit line signal; a write circuit having a function of giving a low potential to one bit line of the bit line pair connected to the memory cell of a write target, and bringing the low potential-side bit line to a negative potential in response to a negative potential boost signal; and a negative potential boost signal generation circuit for generating the negative potential boost signal, the replica bit line being included in a signal generation route of the negative potential boost signal, wherein at the time of data read from the memory cell, the replica bit line signal is output to the replica bit line in response to the replica word line signal, and the sense amplifier circuit is driven by a change of the sense amplifier startup signal in response to the replica bit line signal, and at the time of data write into the memory cell, the low potential-side bit line of the bit line pair of a write target is brought to a negative potential in response to the negative potential boost signal output from the negative potential boost signal generation circuit.

According to the above mode, by use of the sense amplifier startup signal generated based on the replica bit line signal, optimum startup timing can be given to the sense amplifier circuit. Also, since the replica bit line connected to the replica memory cell is connected to the signal generation route of the negative potential boost signal, the signal can be output from the negative potential boost signal generation circuit at optimum timing without the necessity of providing a new dummy bit line. That is, since control signals for data read and data write are generated using one replica circuit, it is possible to eliminate an area overhead arising from preparing individual circuits for data read and data write.

According to the present disclosure, in a semiconductor storage device, since control signals for data read and data write are generated using one replica circuit, an area overhead arising from preparing individual circuits for data read and data write can be eliminated.

DETAILED DESCRIPTION

Figure 1A:
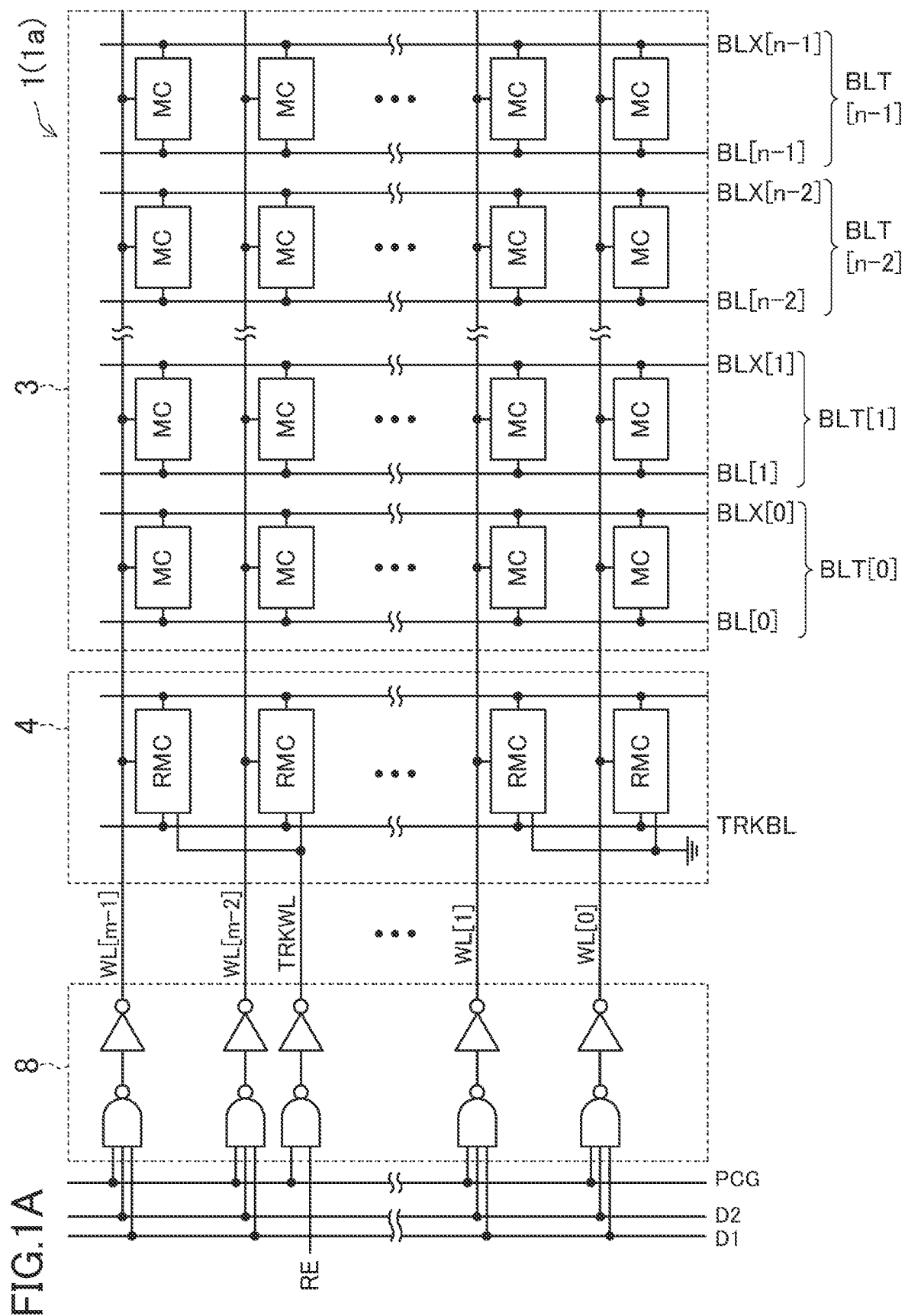
FIG. 1A is a functional block diagram illustrating part of the configuration of a semiconductor memory device (first embodiment).

Embodiments of the present disclosure will be described hereinafter with reference to the accompanying drawings.

Note that, in the following description, the same reference character may be used for representing a signal line and a signal passing through the signal line.

First Embodiment

A semiconductor storage device 1 includes a memory cell array 3, a replica bit line circuit 4, and an amplifier circuit 2.

Figure 1B:
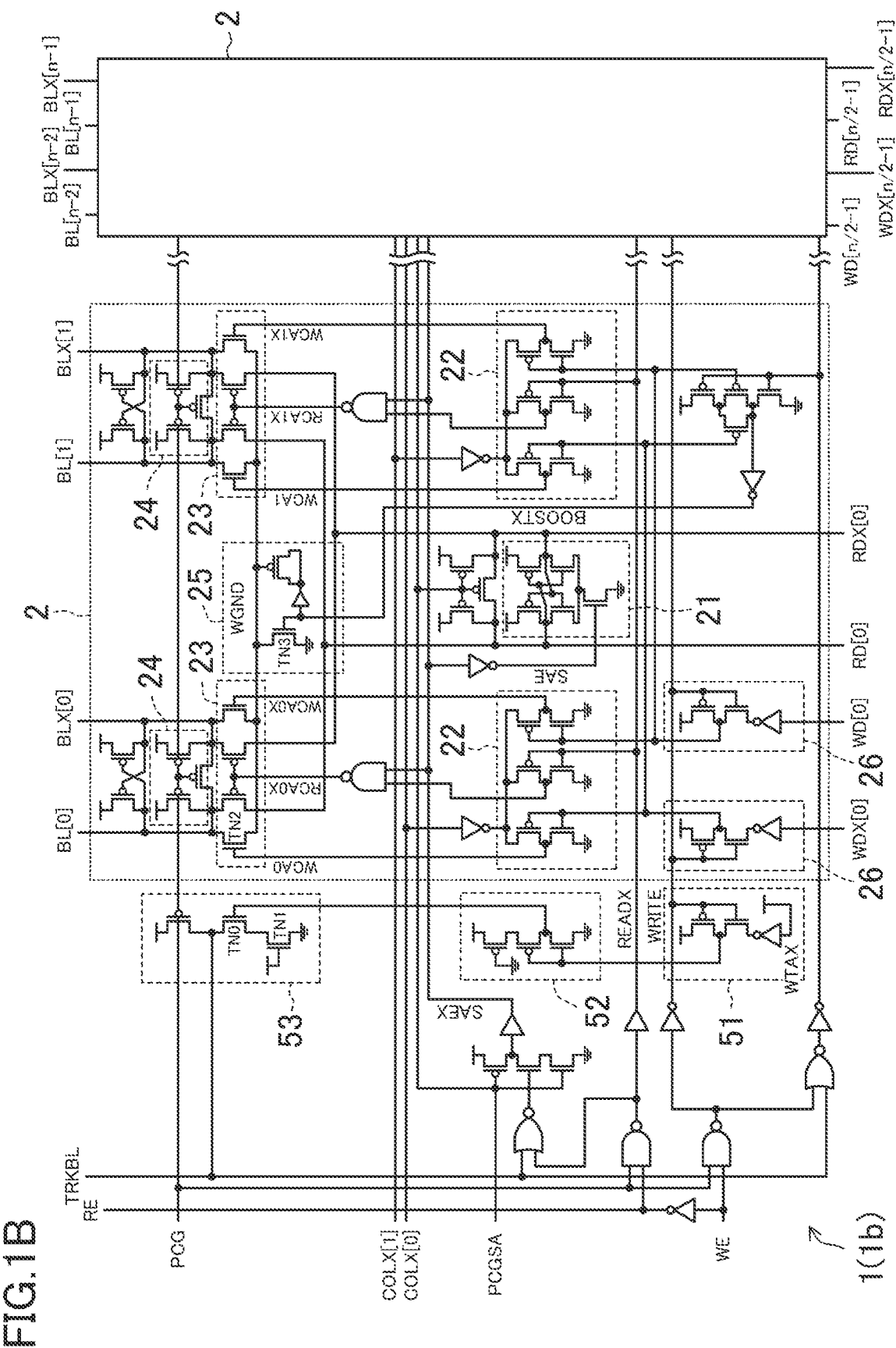
FIG. 1B is a view showing a circuit configuration example of an amplifier circuit constituting the semiconductor memory device (first embodiment).

FIGS. 1A and 1B show a configuration example of the semiconductor storage device 1 according to the first embodiment. The semiconductor storage device 1 includes a configuration 1a of FIG. 1A and a configuration 1b of FIG. 1B. FIG. 1A shows a configuration example of the memory cell array 3, the replica bit line circuit 4, and their peripheral circuits as the configuration 1a. FIG. 1B shows a configuration example of the amplifier circuit 2 and its peripheral circuits as the configuration 1b.

-Memory Cell Array-

As shown in FIG. 1A, the memory cell array 3 includes a plurality of memory cells MC arranged in an array of m rows (m is a natural number)×n columns (n is a natural number).

The memory cell array 3 includes a plurality of (m in FIG. 1A) word lines WL placed in correspondence with the rows of the memory cells MC and a plurality of (n in FIG. 1A) bit line pairs BLT placed in correspondence with the columns of the memory cells MC. The bit line pairs BLT are each constituted by paired bit lines BL and BLX. The word lines WL extend in a first direction (hereinafter called a "row direction"). The bit lines BL and BLX extend in a second direction (hereinafter called a "column direction") perpendicular to the first direction. Each of the memory cells MC is connected to a word line WL and a bit line pair of the row and the column, respectively, corresponding to the position of the memory cell MC.

The word lines WL are connected to a row decoder 8. The row decoder 8 activates a word line WL of a row in which a memory cell of an operation target is included, according to a row address designated from a CPU (not shown).

The bit line pairs BLT are connected to an amplifier circuit 2 to be described later.

Figure 2:
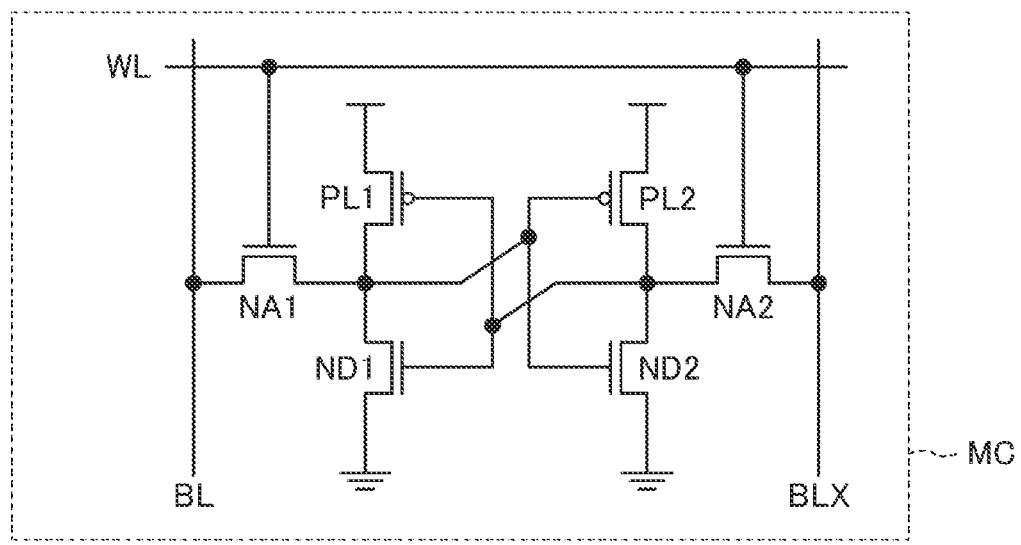
FIG. 2 is a view showing a circuit configuration example of a memory cell in FIG. 1A.

FIG. 2 is a circuit diagram showing an internal configuration of the memory cell MC in FIG. 1A. In FIG. 2, the memory cell MC includes n-type transistors NA1 and NA2, p-type transistors PL1 and PL2, and n-type transistors ND1 and ND2.

The n-type transistor NA1 is connected to the word line WL at its gate and to the bit line BL at its source. The n-type transistor NA2 is connected to the word line WL at its gate and to the bit line BLX at its source. The p-type transistor PL1 is supplied with the power supply voltage VDD at its source and connected to the drain of the n-type transistor NA1 at its drain. The n-type transistor ND1 is connected to the gate of the p-type transistor PL1 at its gate, to the drain of the p-type transistor PL1 at its drain, and to the ground potential VSS at its source. The p-type transistor PL2 is connected to the drain of the n-type transistor NA1 at its gate, supplied with the power supply voltage VDD at its source, and connected to the drain of the n-type transistor NA2 at its drain. The n-type transistor ND2 is connected to the gate of the p-type transistor PL2 at its gate, to the drain of the p-type transistor PL2 at its drain, and to the ground potential VSS at its source. The connection node of the gate of the p-type transistor PL1 and the gate of the n-type transistor ND1 is connected to the drain of the n-type transistor NA2.

The p-type transistor PL1 and the n-type transistor ND1 constitute a first inverter, and the p-type transistor PL2 and the n-type transistor ND2 constitute a second inverter. The input terminal of the first inverter is connected to the output terminal of the second inverter, and the output terminal of the first inverter is connected to the input terminal of the second inverter, whereby a latch circuit is formed.

-Replica Bit Line Circuit-

Referring back to FIG. 1A, the replica bit line circuit 4 includes a plurality of replica memory cells RMC arranged in line in the column direction. In the example of FIG. 1A, the replica bit line circuit 4 includes m replica memory cells RMC.

Figure 3:
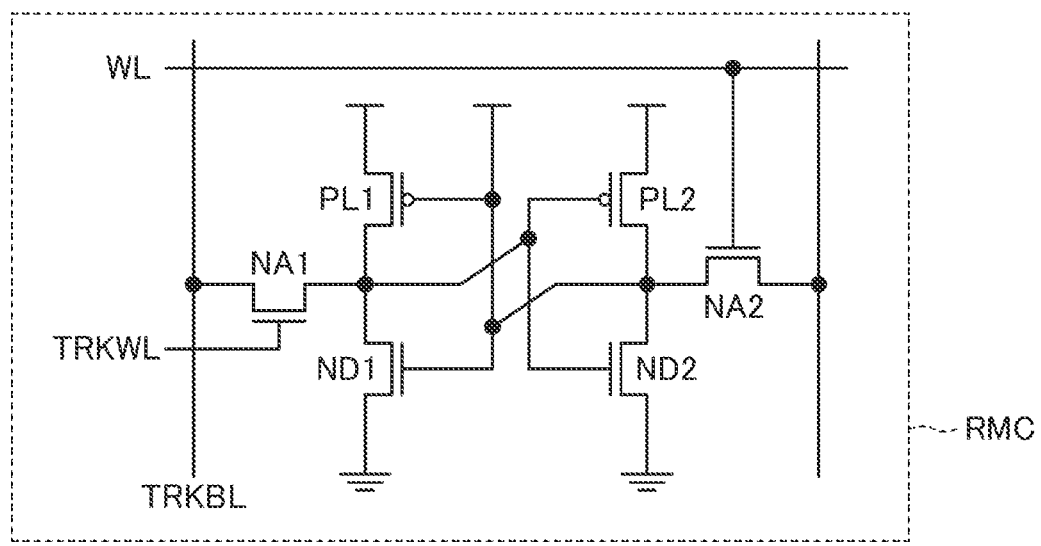
FIG. 3 is a view showing a circuit configuration example of a replica memory cell in FIG. 1A.

FIG. 3 is a circuit diagram showing an internal configuration of the replica memory cell RMC in FIG. 1A. In FIG. 3, the transistors constituting the replica memory cell RMC are the same in size as the transistors constituting the memory cell MC shown in FIG. 2.

The replica memory cell RMC is different from the memory cell MC in that, in the above-described latch circuit, the power supply voltage VDD is supplied to the gate of the p-type transistor PL1 and the gate of the n-type transistor ND1.

Also, the replica memory cell RMC is different from the memory cell MC in that the gate of the n-type transistor NA is connected to a replica word line TRKWL. While the replica word line TRKWL for some replica memory cells RMC is connected to the row decoder 8, the replica word line TRKWL for the other replica memory cells RMC is connected to the ground potential VSS. By changing the number of replica memory cells RMC connected the row decoder 8, the delay amount to be described later can be adjusted. Note that, in the following description, in some cases, the replica memory cell RMC for which the replica word line TRKWL is connected to the row decoder 8 is called a first replica memory cell RMC, and the replica memory cell RMC for which the replica word line TRKWL is connected to the ground potential VSS is called a second replica memory cell RMC, to distinguish one from the other. An input signal into the first replica memory cell RMC through the replica word line TRKWL is generated based on a precharge signal PCG and a read enable signal RE.

At the time of data read, the replica word line TRKWL for the first replica memory cell RMC becomes a high level (also simply called 'H'), whereby a replica bit line TRKBL becomes a low level (also simply called 'L'). This results in output of a replica bit line signal TRKBL from the first replica memory cell RMC. Based on the replica bit line signal TRKBL, a sense amplifier startup signal SAE to be described later is generated.

At the time of data write, the replica word line TRKWL becomes 'L', whereby the first replica memory cell RMC does not operate. This results in that the first replica memory cell RMC and the second replica memory cell RMC only work as a load capacitance against the replica bit line TRKBL. Detailed timing will be described later.

-Amplifier Circuit-

As shown in FIG. 1B, in the illustrated example, one amplifier circuit 2 is provided for every two columns. Specifically, the column connected to the bit line pair BLT[0] (hereinafter called the "first column") and the column connected to the bit line pair BLT[1] (hereinafter called the "second column") are connected to the amplifier circuit 2.

The amplifier circuit 2 includes a sense amplifier circuit 21, a write circuit, a negative potential boost signal generation circuit, and a negative potential generation circuit 25.

<Sense Amplifier Circuit>

The sense amplifier circuit 21 amplifies the signal on the bit line pair BLT in response to the sense amplifier startup signal SAE and outputs the amplified signal to a read data line pair RDT. The read data line pair RDT is constituted by paired read data lines RD and RDX.

More specifically, in this example, a column selector 23 is provided between each of the first and second columns and the sense amplifier circuit 21. The column selectors 23 select one of the first and second columns based on column selection signals RCA (RCA0X and RCA1X). The column selection signals RCA are generated in column control circuits 22 based on column selection signals COLX[1:0].

A signal on the bit line pair BLT of the selected column is input into the sense amplifier circuit 21, which then amplifies the signal and outputs the amplified signal to the read data line pair RDT.

Figure 4A:
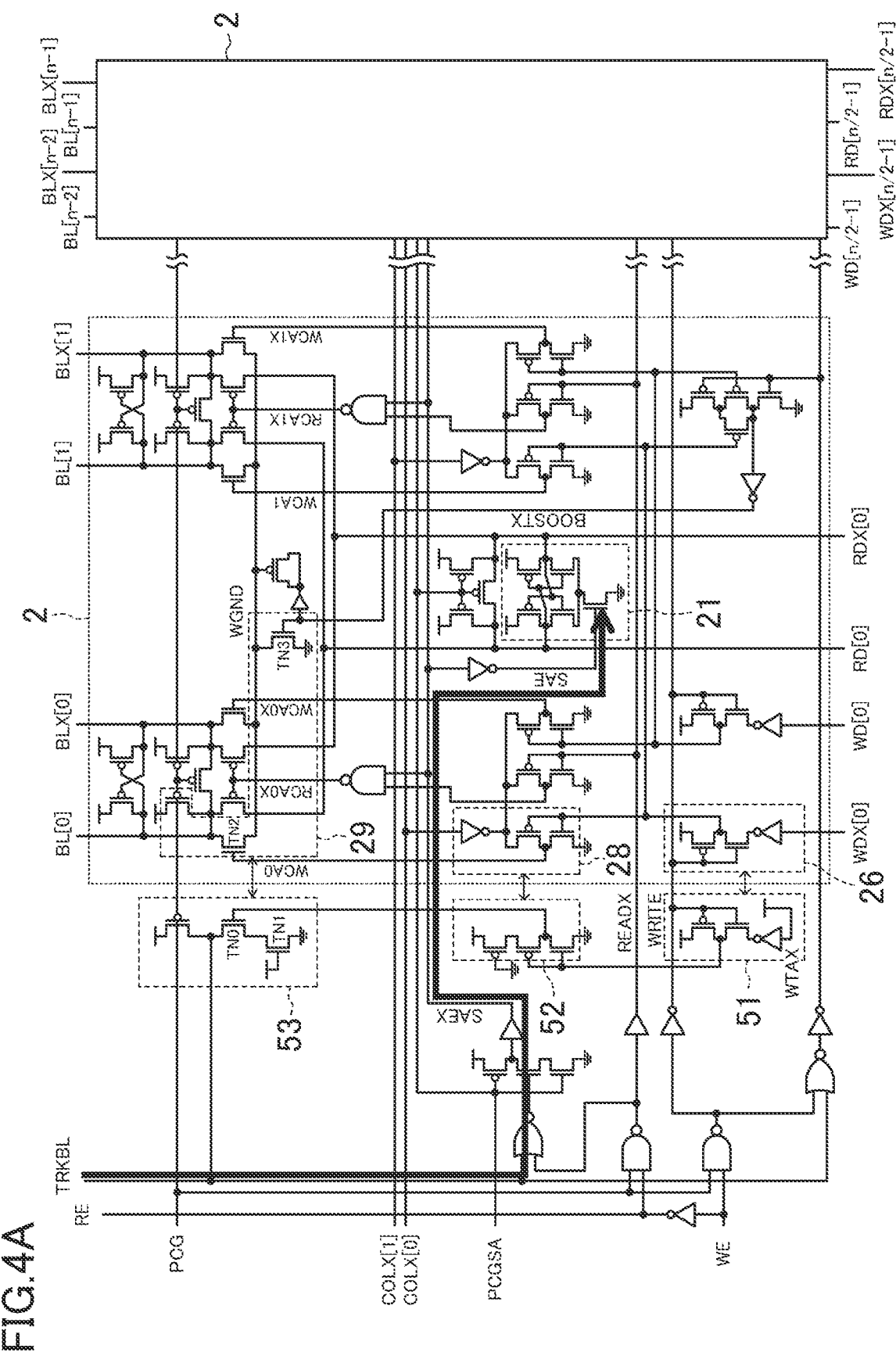
FIG. 4A is a view for explaining a generation route of a sense amplifier startup signal.

FIG. 4A shows, in the same circuit configuration as FIG. 1B, a generation route of the sense amplifier startup signal SAE by the bold solid line. The sense amplifier startup signal SAE is generated based on the replica bit line signal TRKBL output from the first replica memory cell RMC using a predetermined combined circuit. In other words, the replica bit ling signal TRKBL output from the first replica memory cell RMC is fed to the combined circuit through the replica bit line TRKBL.

<Write Circuit>

The write circuit includes a write amplifier having a function of giving a high potential to one of the bit lines of the write-target bit line pair BLT and a low potential to the other bit line. The write amplifier further has a function of bringing the potential of the low potential-side bit line of the bit line pair BLT ("the other bit line" described above) to a negative potential in response to a negative potential boost signal BOOSTX. The write circuit also includes write drivers 26 driven with a write signal WRITE. The write signal WRITE is generated based on a write enable signal WE and the precharge signal PCG. Also, a precharge circuit 24 operating based on the precharge signal PCG is provided for each column.

<Negative Potential Boost Signal Generation Circuit>

The negative potential boost signal generation circuit is a circuit that generates the negative potential boost signal BOOSTX and supplies the signal to the write amplifier. The replica bit line TRKBL is included in the signal generation route of the negative potential boost signal BOOSTX.

In the negative potential generation circuit 25, the signal generation route of the negative potential boost signal BOOSTX forms an equivalent circuit to that of the path for data write. The "equivalent circuit" as used herein refers to a circuit configured so that the delay amount in the signal generation route be as identical as possible to that in the data write path, for example.

After the formation of such an equivalent circuit, additions of configurations and changes of various design parameters and the like, with which the delay amount of part of the circuit is increased, are executed. By doing so, the drive of the low potential-side bit line to a negative potential in response to the negative potential boost signal BOOSTX is to be performed only after the low potential-side bit line BL/BLX has been reliably driven to the ground potential VSS.

Figure 4B:
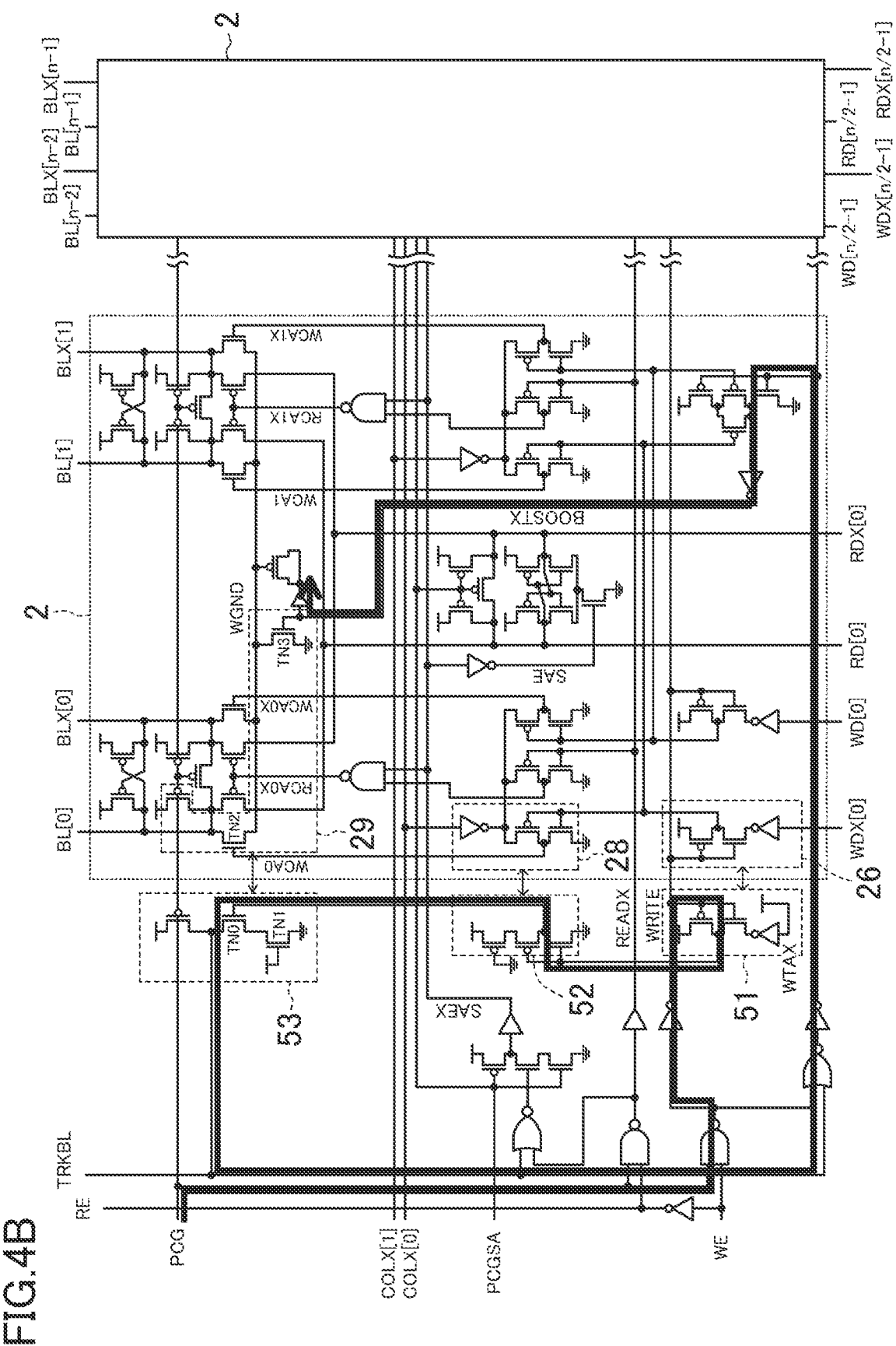
FIG. 4B is a view for explaining a generation route of a negative potential boost signal.

A specific example of the above operation will be described. FIG. 4B shows, in the same circuit configuration as FIG. 1B, the signal generation route of the negative potential boost signal BOOSTX by the bold solid line. In other words, in this example, the circuits placed in the signal generation route of the negative potential boost signal BOOSTX constitute the negative potential boost signal generation circuit.

In the example of FIG. 4B, the signal generation route of the negative potential boost signal BOOSTX includes, in addition to the replica bit line TRKBL, a first replica circuit 51, a second replica circuit 52, and a third replica circuit 53.

The first replica circuit 51 is a replica circuit of the write driver 26. Specifically, the first replica circuit 51 is a replica circuit using transistors same in size and polarity as those of the write driver 26, and configured so that the input-output delay amount be as identical as possible to that of the write driver 26.

The second replica circuit 52 is a replica circuit of a combined circuit inside a box 28 in FIG. 4B. The second replica circuit 52 is configured so that the input-output delay amount be as identical as possible to that of the combined circuit in the box 28.

The third replica circuit 53 is a replica circuit of a combined circuit inside a box 29 in FIG. 4B. The third replica circuit 53 is configured so that the input-output delay amount be as identical as possible to that of the combined circuit in the box 29.

By providing the first to third replica circuits 51 to 53 in the signal generation route of the negative potential boost signal BOOSTX as described above, a delay equivalent to the operation of the write amplifier circuit can be generated.

In the signal generation route of the negative potential boost signal BOOSTX configured as described above, the drive force of a transistor TN0 of the third replica circuit 53 corresponding to a transistor TN2 in the box 29 is made smaller than that of the transistor TN2, for example. Similarly, the drive force of a transistor TN1 of the third replica circuit 53 corresponding to a transistor TN3 in the box 29 is made smaller than that of the transistor TN3. The method of reducing the drive capability of the transistors TN0 and TN1 is not specifically limited. For example, the gate width may be made small, the gate length may be made large, and/or the threshold voltage may be made high.

-Operation of Semiconductor Storage Device-

Figure 5:
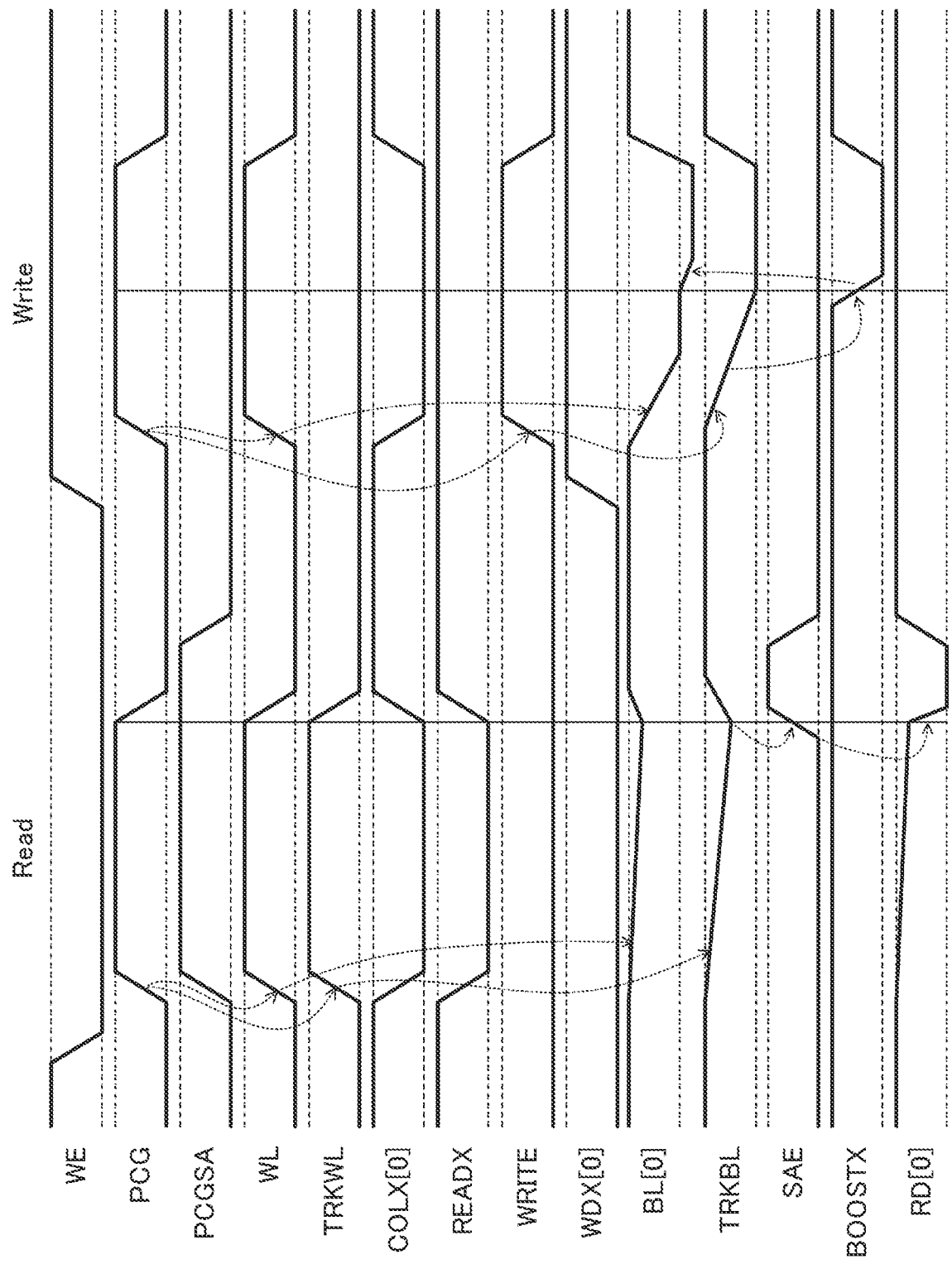
FIG. 5 is a timing chart showing an operation example of the semiconductor storage device (first embodiment).

Next, referring to FIG. 5, the data read operation from a memory cell MC and the data write operation into a memory cell MC in the semiconductor storage device 1 will be described.

<Data Read Operation>

The data read operation from a memory cell MC will be described. In this example, a case of selecting the first column by setting the column selection signal COLX[0]='L' and reading the bit line BL[0]='L' will be described.

First, before rise of the precharge signal PCG, the write enable signal WE becomes 'L'. The write enable signal WE holds the same state during the time of the precharge signal PCG being 'H'.

After the 'L' state of the write enable signal WE is established, the precharge signal PCG, and a signal PCGSA obtained by enlarging the pulse width of the precharge signal PCG, rise to 'H'. The signal PCGSA is a signal that rises to 'H' only in the data read operation.

With the rise of the precharge signal PCG, the word line signal WL corresponding to the read-target memory cell MC and the replica word line signal TRKWL rise to 'H'. Also, almost simultaneously with the rise of the precharge signal PCG, the column selection signal COLX[0] and a signal READX fall to 'L'. The signal READX is a signal that changes based on the write enable signal WE and the precharge signal PCG.

With the rise of the word line signal WL and the replica word line signal TRKWL to 'H', the bit line signal BL[0] and the replica bit line signal TRKBL start to fall to 'L'.

Note here that the replica bit line signal TRKBL has been adjusted to fall down to the threshold of a NOR circuit (e.g., ½ VDD) when the bit line signal BL[0] has fallen to a level required for the sense amplifier operation. The NOR circuit is a circuit that receives the replica bit line signal TRKBL as an input.

The sense amplifier startup signal SAE changes with the output of this NOR circuit. Specifically, when the bit line signal BL[0] has fallen to a level required for the sense amplifier operation, the sense amplifier startup signal SAE rises to 'H'. With this, the sense amplifier starts to operate, whereby 'L' is read as a read data signal RD[0] and 'H' is read as a read data signal RDX[0].

After the sense amplifier startup signal SAE becomes 'H', the precharge signal PCG, the word line signal WL, and the replica word line signal TRKWL become 'L', and the column selection signal COLX[0] and the signal READX become 'H', Thereafter, the bit line signal BL[0] is precharged to 'H'.

Once the read output is established, the signal PCGSA becomes 'L', and the sense amplifier startup signal SAE also becomes 'L', whereby the read operation is terminated.

As described above, in the read operation, by use of the replica memory cell RMC, optimum startup timing can be supplied to the sense amplifier circuit 21.

<Data Write Operation>

Next, the data write operation into a memory cell MC will be described. In this example, a case of selecting the first column by setting the column selection signal COLX[0]='L' and writing a write data signal WDX[0]='H' into the bit line BL[0] will be described. That is, the bit line BL[0]='L' is to be written.

First, before rise of the precharge signal PCG, the write enable signal WE becomes 'H'. As described above, the write enable signal WE holds the same state during the time of the precharge signal PCG being 'H'.

After the 'H' state of the write enable signal WE is established, the precharge signal PCG rises to 'H'. The signal PCGSA remains 'L' during the time of data write.

Before rise of the word line signal WL and the write signal WRITE, the write data signal WDX[0] becomes 'H'. Since the write data signal WDX [0] is an inverted signal of a write data signal WD[0], the write data signal WD[0] becomes 'L'. These signals hold the same state during the time of the word line signal WL and the write signal WRITE being 'H'.

With the rise of the precharge signal PCG, the word line signal WL and the write signal WRITE rise to 'H'. Also, almost simultaneously with the rise of the precharge signal PCG, the column selection signal COLX[0] falls to 'L'.

At this time, since the write enable signal WE='H', the signal RE that is an inverted signal of the write enable signal WE is 'L'. Therefore, the replica word line signal TRKWL remains 'L', causing no operation of the replica memory cell RMC, unlike the time of data read.

With the rise of the word line signal WL to 'H', the bit line signal BL[0] starts to fall to 'L'. Also, the replica bit line signal TRKBL in the signal generation route of the negative potential boost signal BOOSTX starts to fall.

At the time of the fall of the replica bit line signal TRKBL, the replica bit line TRKBL and the replica memory cell RMC work as a load on the replica bit line signal TRKBL.

The negative potential boost signal BOOSTX has been adjusted to become 'L' when the bit line signal BL[0] has fallen down to the ground potential VSS. With this, since a signal WGND becomes a negative potential, the bit line signal BL[0] becomes a negative potential, whereby desired data is written into the write-target memory cell MC.

Once the write operation is terminated, the precharge signal PCG, the word line signal WL, and the write signal WRITE become 'L' and the column selection signal COLX [0] becomes 'H'. With the precharge signal PCG becoming 'L', the bit line signal BL[0] is precharged to 'H'.

As described above, in the write operation, since the replica bit line TRKBL connected to the replica memory cell RMC is used in the generation of the timing signal using the negative bit line technique, optimum startup timing can be supplied to the negative potential generation circuit 25 without the necessity of providing a new dummy bit line.

In this embodiment, therefore, a circuit that generates various operation signals for the semiconductor storage device 1 at appropriate timing can be implemented without an area overhead. More specifically, control signals responsive to data read and data write are generated using one replica circuit. This makes it possible to generate control signals at optimum startup timing and also eliminate an area overhead arising from preparing individual circuits for data read and data write.

-Alteration 1-

Alteration 1 of the semiconductor storage device according to the first embodiment will be described.

Figure 6:
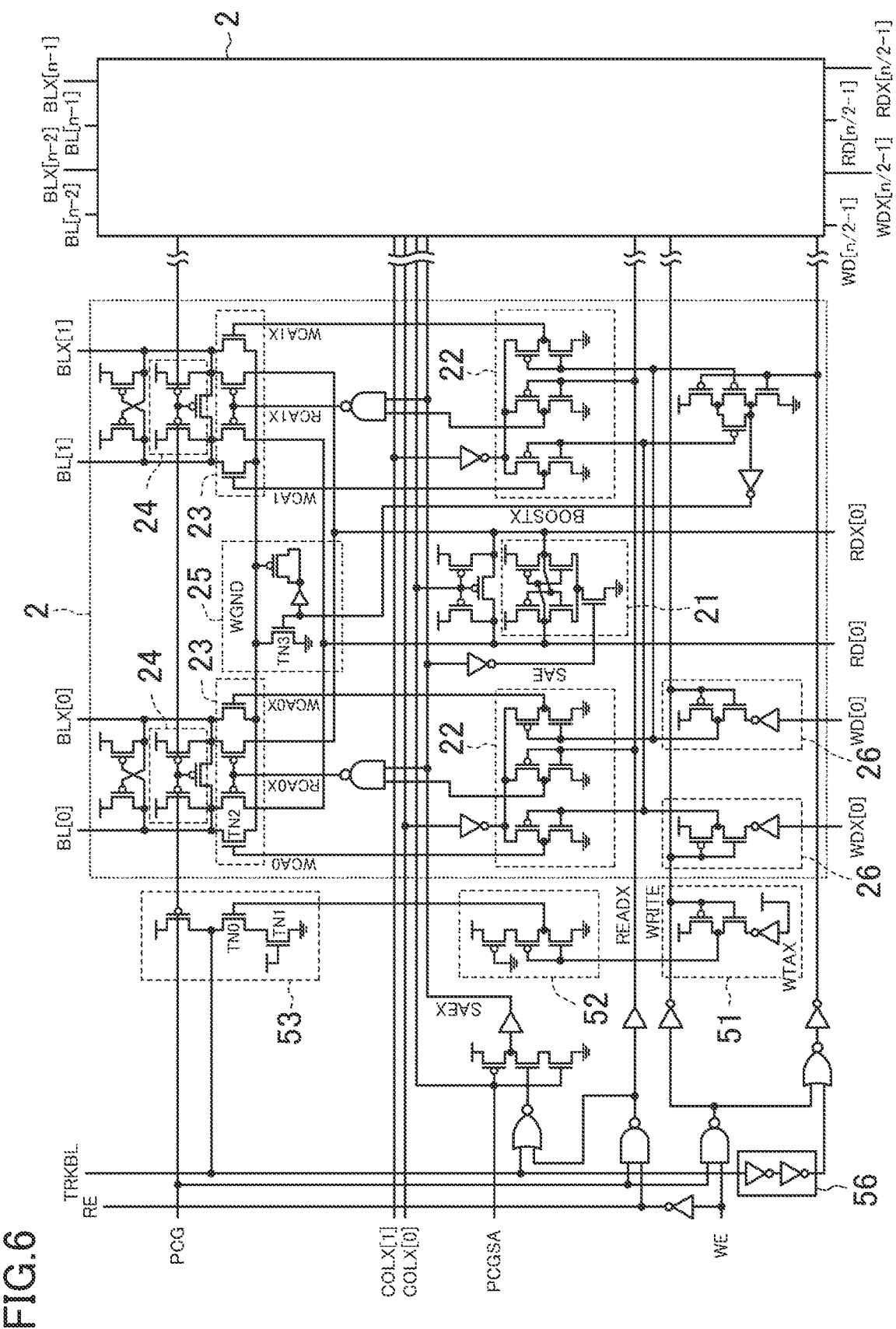
FIG. 6 is a view corresponding to FIG. 1B, showing a semiconductor storage device (Alteration 1 of the first embodiment).

FIG. 6 is a view corresponding to FIG. 1B, showing Alteration 1. As for the configuration of FIG. 1A, Alteration 1 can use the same one as the first embodiment described above.

FIG. 6 is different from FIG. 1B in that a delay buffer 56 is provided at a position on the replica bit line TRKBL and also in the signal generation route of the negative potential boost signal BOOSTX.

With the delay buffer 56 provided as described above, the delay in the signal generation route of the negative potential boost signal BOOSTX can be adjusted in addition to, or in place of, the adjustment of the delay amount in the transistors TN0 and TN1 described earlier, whereby the timing of the negative potential boost signal BOOSTX can be optimized.

-Alteration 2-

Alteration 2 of the semiconductor storage device according to the first embodiment will be described.

Figure 7:
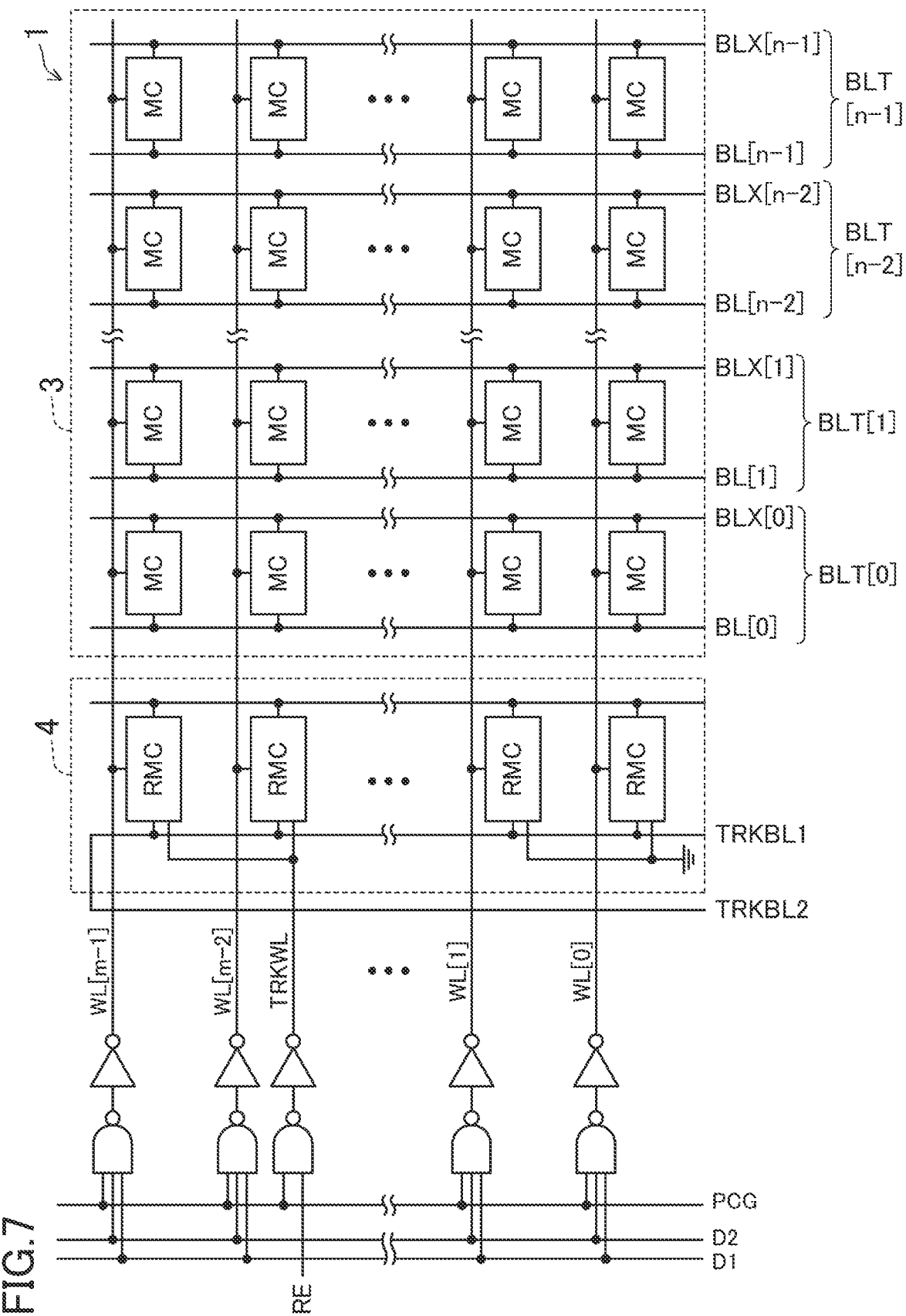
FIG. 7 is a view corresponding to FIG. 1A, showing a semiconductor storage device (Alteration 2 of the first embodiment).
Figure 8:
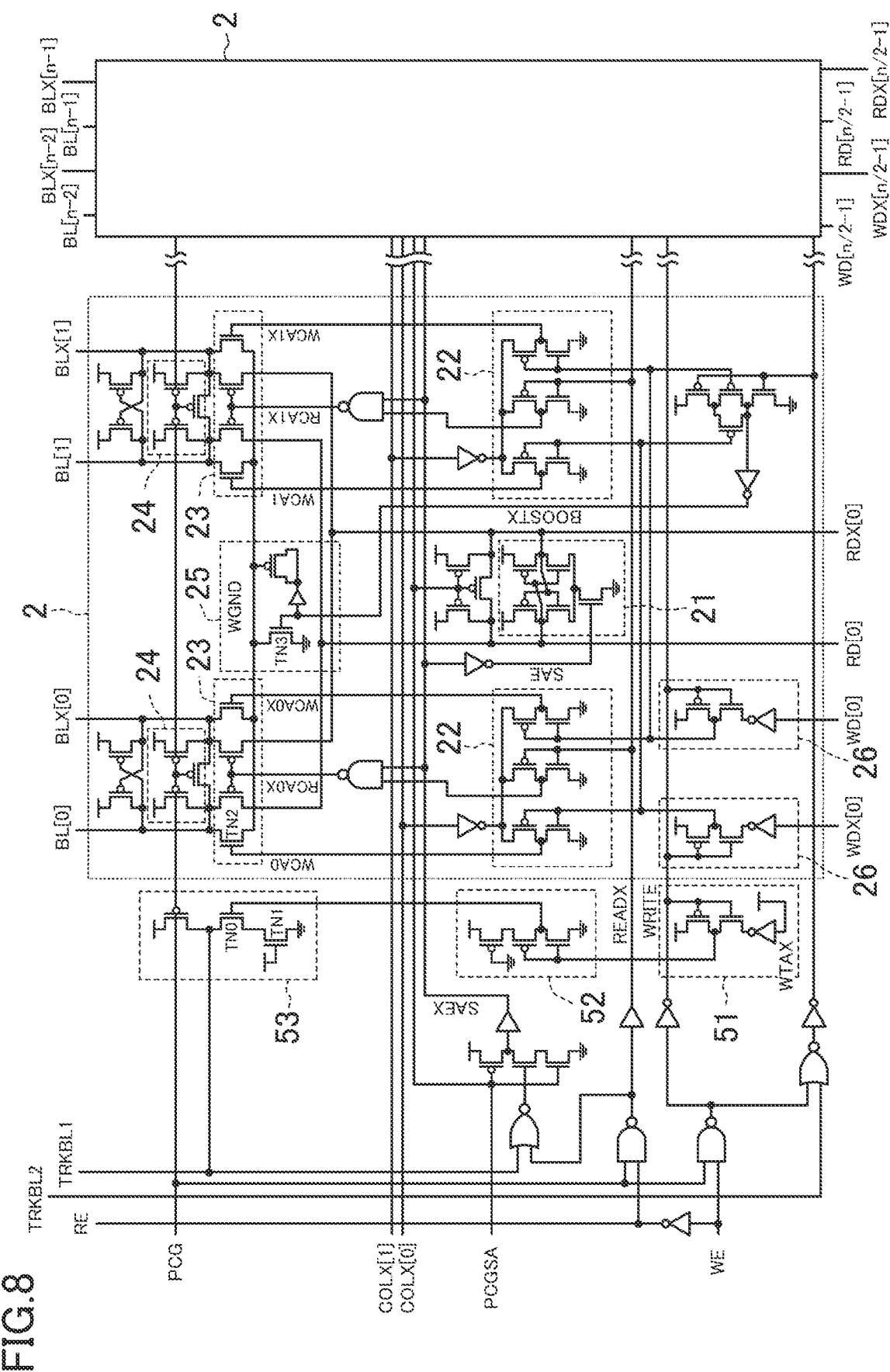
FIG. 8 is a view corresponding to FIG. 1B, showing the semiconductor storage device (Alteration 2 of the first embodiment).

FIG. 7 is a view corresponding to FIG. 1A, and FIG. 8 is a view corresponding to FIG. 1B, showing Alteration 2.

The configuration of Alteration 2 is different from that in FIG. 1A in that the replica bit line TRKBL is branched into two. In this alteration, as shown in FIG. 7, the replica bit line TRKBL includes a first replica bit line TRKBL1 and a second replica bit line TRKBL2.

The first replica bit line TRKBL1, which corresponds to the replica bit line TRKBL in FIG. 1A, extends to be in parallel with the bit line pairs BLT and is connected to the plurality of replica memory cells RMC.

The second replica bit line TRKBL2 is branched at the connecting position of the replica memory cell RMC located farthest from the amplifier circuit 2 and the first replica bit line TRKBL1. After the branching, the second replica bit line TRKBL2 is turned back at a position farther than the farthest replica memory cell RMC from the amplifier circuit 2, and extends to be in parallel with the first replica bit line TRKBL1.

The first replica bit line TRKBL1 is used for supply of the replica bit line signal TRKBL for generating the sense amplifier startup signal SAE. In other words, the first replica bit line TRKBL1 is connected to the circuit for generating the sense amplifier startup signal SAE.

Also, the first replica bit line TRKBL1 is connected to the output node of the transistor TN0 of the third replica circuit 53 constituting the negative potential boost signal generation circuit. And, a circuit subsequent to the transistor TN0 ("NOR circuit" in this example) is connected via the first replica bit line TRKBL1 and the second replica bit line TRKBL2. With this, a resistance and a capacitance greater than those in FIG. 1A are to be connected between the transistor TN0 and the subsequent circuit, whereby the delay amount can be increased. As a result, the optimization of the timing of the negative potential boost signal BOOSTX can be made more easily.

The branch position of the replica bit line TRKBL is not limited to the position in FIG. 7, i.e., the connecting position of the farthest replica memory cell RMC from the amplifier circuit 2 and the first replica bit line TRKBL1. For example, the second replica bit line TRKBL2 may be branched from the first replica bit line TRKBL1 at the intermediate position of the plurality of replica memory cells RMC in the column direction (the vertical direction in the figure), and extended to be in parallel with the first replica bit line TRKBL1.

By changing the branch position of the second replica bit line TRKBL2 as described above, the resistance value of the generation route of the negative potential boost signal BOOSTX can be changed. In other words, the delay amount of the negative potential boost signal BOOSTX can be adjusted.

From the standpoint of the generation route of the sense amplifier startup signal SAE, in this alteration, in comparison with the first embodiment, the capacitance is doubled while the resistance is unchanged. In this regard, when it is desired to output the sense amplifier startup signal SAE at a timing similar to that in the first embodiment, it is advisable to increase (e.g., double) the number of replica memory cells RMC connected in parallel to the first replica bit line TRKBL1.

Second Embodiment

A semiconductor storage device 1 according to the second embodiment will be described.

Figure 9:
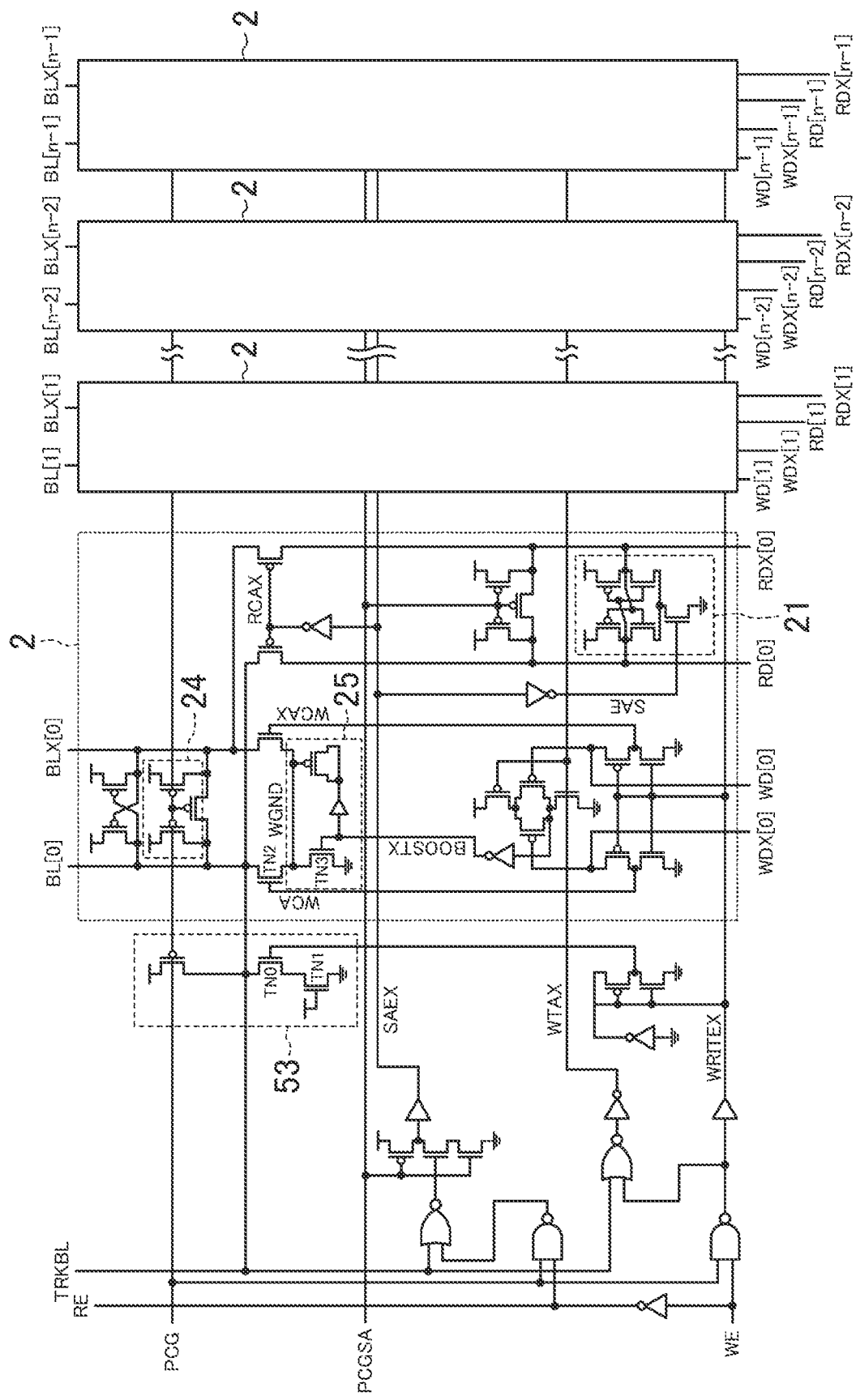
FIG. 9 is a view corresponding to FIG. 1B, showing a semiconductor storage device (second embodiment).

FIG. 9 is a view corresponding to FIG. 1B, showing the second embodiment. As for the configuration of FIG. 1A, the second embodiment can use the same one as the first embodiment described above. Description here will be made centering on points different from the first embodiment.

In this embodiment, the column selection function of the first embodiment is omitted. In the example of FIG. 9, in comparison with FIG. 1B, the column selection signals COLX[1:0] are omitted, and the corresponding circuits (e.g., the column selectors 23 and the column control circuits 22) are also omitted. As a result, in the generation route of the negative potential boost signal BOOSTX, circuits related to the column selection function (e.g., the second replica circuit 52) are omitted.

Figure 10:
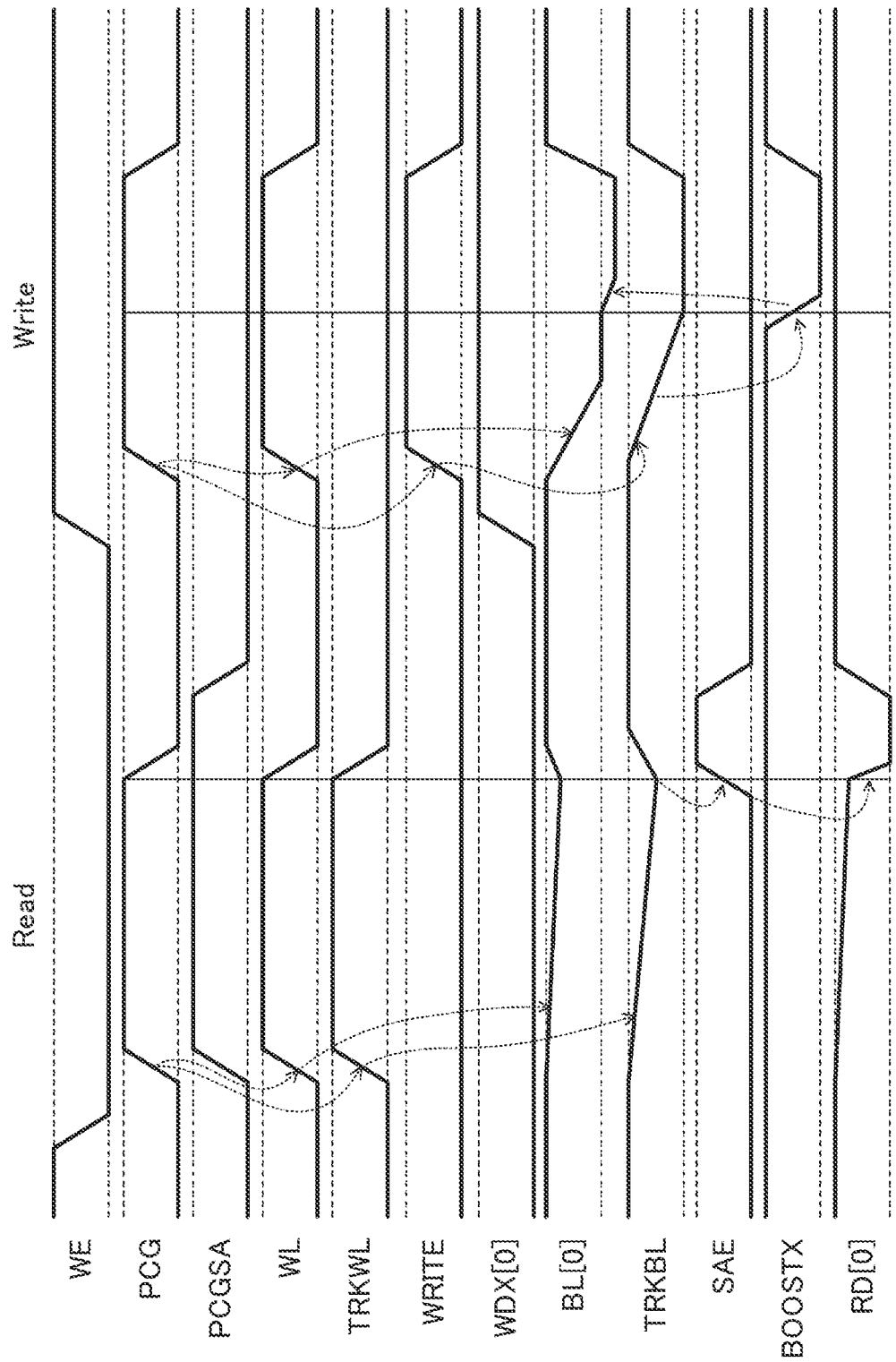
FIG. 10 is a timing chart showing an operation example of the semiconductor storage device (second embodiment).

The other configurations and operations are roughly the same as in the first embodiment, and therefore detailed description thereof is omitted here. FIG. 10 is a timing chart showing an operation example of the semiconductor storage device 1 of this embodiment, which corresponds to FIG. 5 in the first embodiment. As shown in FIG. 10, in comparison with FIG. 5, the column selection signal COLX[0] and the signal READX are omitted. The other operations are roughly the same as in FIG. 5.

As described above, in this embodiment, also, similar advantages as those in the first embodiment are obtained.

-Alteration 1-

In the second embodiment, as in FIG. 6, a delay buffer 56 may be provided at a position on the replica bit line TRKBL and also in the signal generation route of the negative potential boost signal BOOSTX.

With the delay buffer 56 provided as described above, the delay in the signal generation route of the negative potential boost signal BOOSTX can be adjusted in addition to, or in place of, the adjustment of the delay amount in the transistors TN0 and TN1, whereby the timing of the negative potential boost signal BOOSTX can be optimized.

-Alteration 2-

In the second embodiment, as in Alteration 2 of the first embodiment, the replica bit line TRKBL may be branched into a first replica bit line TRKBL1 and a second replica bit line TRKBL2.

By branching the replica bit line TRKBL as described above, a resistance and a capacitance greater than those in FIG. 9 are to be connected between the transistor TN0 and the subsequent circuit, whereby the delay amount can be increased. As a result, the optimization of the timing of the negative potential boost signal BOOSTX can be made more easily.

In Alteration 2, as in Alteration 2 of the first embodiment, the branch position of the second replica bit line TRKBL2 may be changed. By this change, the delay amount of the negative potential boost signal BOOSTX can be adjusted.

According to the present disclosure, a circuit that generates various operation signals for a semiconductor storage device at appropriate timing can be implemented without an area overhead. The present disclosure is therefore highly useful.

The invention claimed is:

1. A semiconductor storage device, comprising:
a memory cell array including a plurality of memory cells, each of the plurality of memory cells being connected to a corresponding bit line pair;
a replica bit line circuit including a plurality of replica memory cells, each of the plurality of replica memory cells outputting a replica bit line signal to a common replica bit line in response to a replica word line signal;
a sense amplifier circuit for amplifying a signal on the bit line pair in response to a sense amplifier startup signal generated based on the replica bit line signal;
a write circuit having a function of giving a low potential to one bit line of the bit line pair connected to the memory cell of a write target, and bringing the low potential-side bit line to a negative potential in response to a negative potential boost signal;
a buffer circuit connected to the replica bit line; and
a negative potential boost signal generation circuit for generating the negative potential boost signal, the replica bit line and the buffer circuit being included in a signal generation route of the negative potential boost signal, the buffer circuit outputting the negative potential boost signal,
wherein
the buffer circuit includes:
a replica circuit of a write driver for outputting a control signal at a time of data write into the memory cell; and
an inverter circuit for receiving the control signal and outputting a delay signal of the control signal,
at a time of data read from the memory cell, the replica bit line signal is output to the replica bit line in response to the replica word line signal, and the sense amplifier circuit is driven by a change of the sense amplifier startup signal in response to the replica bit line signal, and at the time of data write into the memory cell, the low potential-side bit line of the bit line pair of a write target is brought to a negative potential in response to the negative potential boost signal output from the negative potential boost signal generation circuit.

2. The semiconductor storage device of claim 1, wherein the replica bit line includes: a first replica bit line extending to be in parallel with the bit line pair and connected to the plurality of replica memory cells; and a second replica bit line branched from the first replica bit line and extending to be in parallel with the first replica bit line, the replica bit line signal is supplied to the sense amplifier circuit via the first replica bit line, and the first replica bit line and the second replica bit line are placed in the negative potential boost signal generation route.

3. The semiconductor storage device of claim 2, wherein the second replica bit line is branched at a connecting position of the replica memory cell located farthest from the negative potential boost signal generation circuit and the first replica bit line, and turned back at a position farther than the farthest replica memory cell.

4. The semiconductor storage device of claim 1, wherein the memory cell array is constituted by a plurality of columns, each of the columns having a plurality of the memory cells connected to the same bit line pair as a unit, and the device comprises a column selector for selecting a column of a data read target or a data write target among the plurality of columns.

5. The semiconductor storage device of claim 1, wherein the inverter circuit outputs the delay signal as the negative potential boost signal.

* * * * *